(12) United States Patent
Tengner

(10) Patent No.: US 8,829,732 B2
(45) Date of Patent: Sep. 9, 2014

(54) WIRELESS POWER RECEIVING UNIT OR WIRELESS POWER TRANSFERRING UNIT WITH GUIDE MEMBER PROVIDING MAGNETIC PERMEABILITY TRANSITION BETWEEN A CONCENTRATOR CORE AND SURROUNDING MEDIUM

(71) Applicant: Tomas Tengner, Vasteras (SE)

(72) Inventor: Tomas Tengner, Vasteras (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/683,818

(22) Filed: Nov. 21, 2012

(65) Prior Publication Data

US 2013/0082539 A1    Apr. 4, 2013

Related U.S. Application Data

(63) Continuation of application No. PCT/EP2010/057266, filed on May 26, 2010.

(51) Int. Cl.
| | | |
|---|---|---|
| H04B 5/00 | (2006.01) | |
| H01F 38/14 | (2006.01) | |
| B60L 11/18 | (2006.01) | |
| H01F 27/36 | (2006.01) | |
| H02J 5/00 | (2006.01) | |
| H02J 7/02 | (2006.01) | |

(52) U.S. Cl.
CPC .............. *H01F 38/14* (2013.01); *H04B 5/0075* (2013.01); *H04B 5/0037* (2013.01); *B60L 11/182* (2013.01); *H01F 27/36* (2013.01); *H02J 5/005* (2013.01); *H02J 7/025* (2013.01); *Y02T 10/7005* (2013.01); *Y02T 10/7088* (2013.01); *Y02T 90/122* (2013.01); *Y02T 90/14* (2013.01)
USPC .......................................... 307/104

(58) Field of Classification Search
CPC ....... H04B 5/00; H04B 5/0037; H04B 5/0075
USPC ........................................... 307/104
See application file for complete search history.

(56) References Cited

U.S. PATENT DOCUMENTS 5,477,122 A * 12/1995 Hall et al. .................... 336/90
6,124,776 A *  9/2000 Aiello et al. ............... 335/284

(Continued)

FOREIGN PATENT DOCUMENTS

| GB | 2388716 A | 11/2003 |
| JP | H0613244 A | 1/1994 |

(Continued)

OTHER PUBLICATIONS

International Search Report and Written Opinion of the International Searching Authority Application No. PCT/EP2010/057266 Completed: May 25, 2011; Mailing Date: Jun. 9, 2011 8 pages.

(Continued)

*Primary Examiner* — Adi Amrany
(74) *Attorney, Agent, or Firm* — St. Onge Steward Johnston & Reens LLC

(57) ABSTRACT

A wireless power transferring device, a wireless power transferring unit and a wireless power receiving unit for transferring and receiving power. The power receiving unit includes an induction coil adapted to be subjected to an alternating magnetic field so that an alternating current is induced in the induction coil, a receiving concentrator core adapted to concentrate the magnetic field wherein the receiving concentrator core is surrounded by a medium, and a receiving guide member arranged to provide a smooth transition for the magnetic field between the medium and the concentrator core, and abutting the receiving concentrator core. The receiving guide member has a magnetic permeability in the range between the magnetic permeability of the receiving concentrator core and the medium.

14 Claims, 2 Drawing Sheets

(56) References Cited

U.S. PATENT DOCUMENTS

| | | |
|---|---|---|
| 6,980,077 B1 | 12/2005 | Chandrasekaran et al. |
| 7,077,045 B2 * | 7/2006 | Dietrich et al. ............ 89/6 |
| 7,193,578 B1 * | 3/2007 | Harris et al. ............ 343/767 |
| 7,479,861 B2 * | 1/2009 | Zepke et al. ............ 336/178 |
| 8,269,595 B2 * | 9/2012 | Okada et al. ............ 336/200 |
| 2008/0012680 A1 * | 1/2008 | Muelleman ............ 336/212 |
| 2009/0015197 A1 * | 1/2009 | Sogabe et al. ............ 320/108 |
| 2009/0267558 A1 | 10/2009 | Jung |
| 2010/0081483 A1 | 4/2010 | Chatterjee et al. |
| 2011/0115429 A1 * | 5/2011 | Toivola et al. ............ 320/108 |

FOREIGN PATENT DOCUMENTS

| | | |
|---|---|---|
| JP | 2004047700 A | 2/2004 |
| JP | 2009005475 A | 1/2009 |
| JP | 2010093180 A | 4/2010 |
| JP | 2010283263 A | 12/2010 |
| WO | 2008140333 A2 | 11/2008 |

OTHER PUBLICATIONS

Notice of Reasons for Rejection Application No. 2013-511547 Issued: Jan. 14, 2014 3 pages.

* cited by examiner

WIRELESS POWER RECEIVING UNIT OR WIRELESS POWER TRANSFERRING UNIT WITH GUIDE MEMBER PROVIDING MAGNETIC PERMEABILITY TRANSITION BETWEEN A CONCENTRATOR CORE AND SURROUNDING MEDIUM

FIELD OF THE INVENTION

The present invention generally relates to a wireless power receiving unit for receiving power and a wireless power transferring unit for transferring power.

The present invention also generally relates to a wireless power transferring device, which power transferring device comprises a wireless power transferring unit and a wireless power receiving unit, and use of the wireless power transferring device.

BACKGROUND OF THE INVENTION

Wireless power transferring devices, such as Inductively Coupled Power Transfer systems (ICPT), are used for transferring power from a power transferring unit to a power receiving unit. Wireless power transferring devices are for example used for charging battery units of an electric vehicle.

The power transferring unit is adapted to generate an alternating magnetic field of high frequency. The magnetic field couples the power transferring unit to the power receiving unit over a gap with a medium. The gap is often denoted "air gap" even if other medium than air is used in the gap.

The power receiving unit is adapted to be subjected to the alternating magnetic field and induce an alternating current. The induced alternating current is for example used to power a load or rectified and used for charging batteries.

A problem with wireless power transferring devices is that ferromagnetic materials, such as a steel body of a vehicle, in vicinity of the device is subjected to the alternating magnetic field, wherein the material is heated up due to eddy currents. Accordingly, the energy transfer efficiency between the power transferring unit and the power receiving unit is not optimal. Furthermore, it is important to limit the spread of the alternating magnetic field to the surrounding environment since high flux of the alternating magnetic field could have biological impact on people and animals.

US2009/0267558 discloses a wireless power charging system comprising a primary core and a secondary core. The primary core comprises a transmission shield panel. The secondary core comprises an eddy current reducing member and receiving shield panel.

WO2008/140333 discloses an inductive power transfer unit for charging electrical vehicles. The unit comprises a coil and a ferrite core, which ferrite core comprises a plurality of bars protruding away from a center of the unit. The outer part of the bars comprises insulating pads of foam or rubber adapted to protect the bars from mechanical stress caused by impacts and vibrations.

SUMMARY OF THE INVENTION

One object of the present invention is to provide a wireless power receiving unit with improved power receiving efficiency, a wireless power transferring unit with improved power transferring efficiency, and wireless power transferring device with improved power transferring and receiving efficiency. A further object of the present invention is to provide a wireless power receiving unit, a wireless power transferring unit and wireless power transferring device that limits the spread of the alternating magnetic field to the surrounding environment.

This object may be achieved by a wireless power receiving unit, characterized in that the power receiving unit comprises a receiving guide member arranged to provide a transition for the magnetic field between the medium and the receiving concentrator core, and abutting the receiving concentrator core, which receiving guide member has a magnetic permeability in the range between the magnetic permeability of the receiving concentrator core and the medium.

The receiving concentrator core may be positioned in vicinity of the induction coil and is adapted to be subjected to the alternating magnetic field from the power transferring unit. The receiving concentrator core is adapted to concentrate the magnetic field and enhance the magnetic coupling between the power transferring unit and the power receiving unit.

The receiving guide member may abut the receiving concentrator core, wherein the receiving guide member provides a transition for the magnetic field between the medium and the receiving concentrator core. Thereby, the receiving guide member enhances the exposure of the induction coil to the magnetic field, wherein the efficiency of the power receiving unit is improved.

The term "receiving concentrator core" refers to a member with property of high magnetic permeability, high magnetic saturation point, low electrical conductivity and soft magnetic characteristics with low hysteresis.

The medium may have a magnetic permeability that is lower than the magnetic permeability of the receiving concentrator core. The magnetic field is coupled over the medium between the power receiving unit and power transferring unit.

According to one embodiment of the invention, the medium is non-magnetic, wherein the relative magnetic permeability of the medium is approximately 1.

According to one embodiment of the invention, the receiving guide member has a relative magnetic permeability of more than 5.

According to one embodiment of the invention, the receiving concentrator core comprises a metal oxide such as $Fe_2O_3$ with ZnO, NiO, MnO, CuO, etcetera, or a combination thereof. Preferably, the receiving concentrator core comprises a so called soft ferrite, which soft ferrite does not retain significant magnetization.

According to one embodiment of the invention, the relative magnetic permeability of the receiving concentrator core is between 100-20000, preferably between 1000-3000.

According to one embodiment of the invention, the power receiving unit and power transferring unit are separated by a gap with the medium.

According to one embodiment of the invention, the medium is air or water, wherein the magnetic permeability of the receiving guide member is in the range between the magnetic permeability of the receiving concentrator core and the air or water.

According to one embodiment of the invention, the receiving guide member at least partly surrounds the receiving concentrator core.

According to one embodiment of the invention, the receiving guide member comprises an inner part abutting the receiving concentrator core and an outer part abutting the surrounding medium. Accordingly, the receiving guide member is between the receiving concentrator core and the surrounding medium.

According to one embodiment of the invention, the magnetic permeability of the receiving guide member is decreasing from the inner part to the outer part. The decreasing of the magnetic permeability from the inner part to the outer part improves the transition for the magnetic field from the medium to the receiving concentrator core.

According to one embodiment of the invention, the magnetic permeability of the receiving guide member is decreasing continuously from the inner part to the outer part. The continuous decreasing of the magnetic permeability from the inner part to the outer part improves the transition for the magnetic field from the medium to the receiving concentrator core.

According to one embodiment of the invention, the receiving guide member comprises an inner ring abutting the receiving concentrator core and an outer ring abutting the surrounding medium, wherein the magnetic permeability of the inner ring is higher than the outer ring.

According to one embodiment of the invention, the receiving guide member comprises one or more intermediate rings between the inner ring and the outer ring, wherein the magnetic permeability of the intermediate rings are lower than the inner ring and higher than the outer ring.

According to one embodiment of the invention, the induction coil comprises a center axis and the receiving concentrator core comprises an envelope surface, which envelope surface is directed away from the center axis, wherein the receiving guide member is abutting the envelope surface of the receiving concentrator core.

According to one embodiment of the invention, the receiving guide member is manufactured of a resin, such as an epoxy resin, a polyurethane resin, a melamine resin, etcetera, comprising iron powder. Thereby, the electric conductivity is low and the magnetic permeability is dependent on the iron powder concentration in the resin.

According to one embodiment of the invention, the power receiving unit comprises a shield member adapted to shield the magnetic field, wherein the shield member comprises a conductive non-magnetic material.

According to one embodiment of the invention, the shield member is adapted to be located in between the induction coil and an arrangement comprising a ferromagnetic conductive material.

According to one embodiment of the invention, the power receiving unit is adapted to be connected to a battery unit, wherein the alternating current induced in the induction coil is adapted to charge the battery unit.

According to one embodiment of the invention, the shield member is made of aluminum or copper.

According to one embodiment of the invention, the power receiving unit is adapted to be arranged at vehicle and directed towards the power transferring unit arranged at the ground.

An object of the invention is further achieved by a wireless power transferring unit, characterized in that the power transferring unit comprises a transferring guide member arranged to provide a transition for the magnetic field between the medium and the transferring concentrator core, and at least partly abutting the transferring concentrator core, which transferring guide member has a magnetic permeability in the range between the magnetic permeability of the transferring concentrator core and the medium.

The transferring concentrator core may be positioned in vicinity of the generating coil. The transferring concentrator core is adapted to be subjected to the alternating magnetic field from the generating coil.

The transferring guide member may abut the transferring concentrator core, wherein the transferring guide member provides a transition for the magnetic field from the transferring concentrator core to the surrounding medium. Thereby, the transferring guide member guides the magnetic field toward the power receiving unit.

According to one embodiment of the invention, the transferring guide member has a relative magnetic permeability of more than 5.

According to one embodiment of the invention, the transferring guide member at least partly surrounds the transferring concentrator core.

According to one embodiment of the invention, the transferring guide member comprises an inner part abutting the transferring concentrator core and an outer part abutting the surrounding medium.

According to one embodiment of the invention, the magnetic permeability of the transferring guide member is decreasing from the inner part to the outer part.

According to one embodiment of the invention, the magnetic permeability of the transferring guide member is decreasing continuously from the inner part to the outer part.

According to one embodiment of the invention, the transferring guide member comprises an inner ring abutting the transferring concentrator core and an outer ring abutting the surrounding medium, wherein the magnetic permeability of the inner ring is higher than the outer ring.

According to one embodiment of the invention, the transferring guide member comprises one or more intermediate rings between the inner ring and the outer ring, wherein the magnetic permeability of the intermediate rings are lower than the inner ring and higher than the outer ring.

According to one embodiment of the invention, the generating coil comprises a center axis and the transferring concentrator core comprises an envelope surface, which envelope surface is directed away from the center axis, wherein the transferring guide member is abutting the envelope surface of the transferring concentrator core.

According to one embodiment of the invention, the transferring guide member is manufactured of a resin, such as an epoxy resin, a polyurethane resin, a melamine resin, etcetera, comprising iron powder. Thereby, the electric conductivity is low and the magnetic permeability is dependent on the iron powder concentration in the resin.

According to one embodiment of the invention, the power transferring unit comprises a shield member adapted to shield the magnetic field, wherein the shield member comprises a conductive non-magnetic material.

According to one embodiment of the invention, the power transferring unit is adapted to be connected to a power source, which power source is adapted to supply electric power to the generating coil so that the alternating magnetic field is generated in the generating coil.

According to one embodiment of the invention, the power transferring unit is adapted to be arranged at the ground and directed towards the power receiving unit arranged above the ground.

An object of the invention is further achieved by a wireless power transferring device and the use of a wireless power transferring device, wherein the power transferring device comprises a wireless power transferring unit and a wireless power receiving unit.

BRIEF DESCRIPTION OF THE DRAWINGS

The invention will now be explained more closely by the description of different embodiments of the invention and with reference to the appended figures.

DETAILED DESCRIPTION OF THE INVENTION

Figure 1:
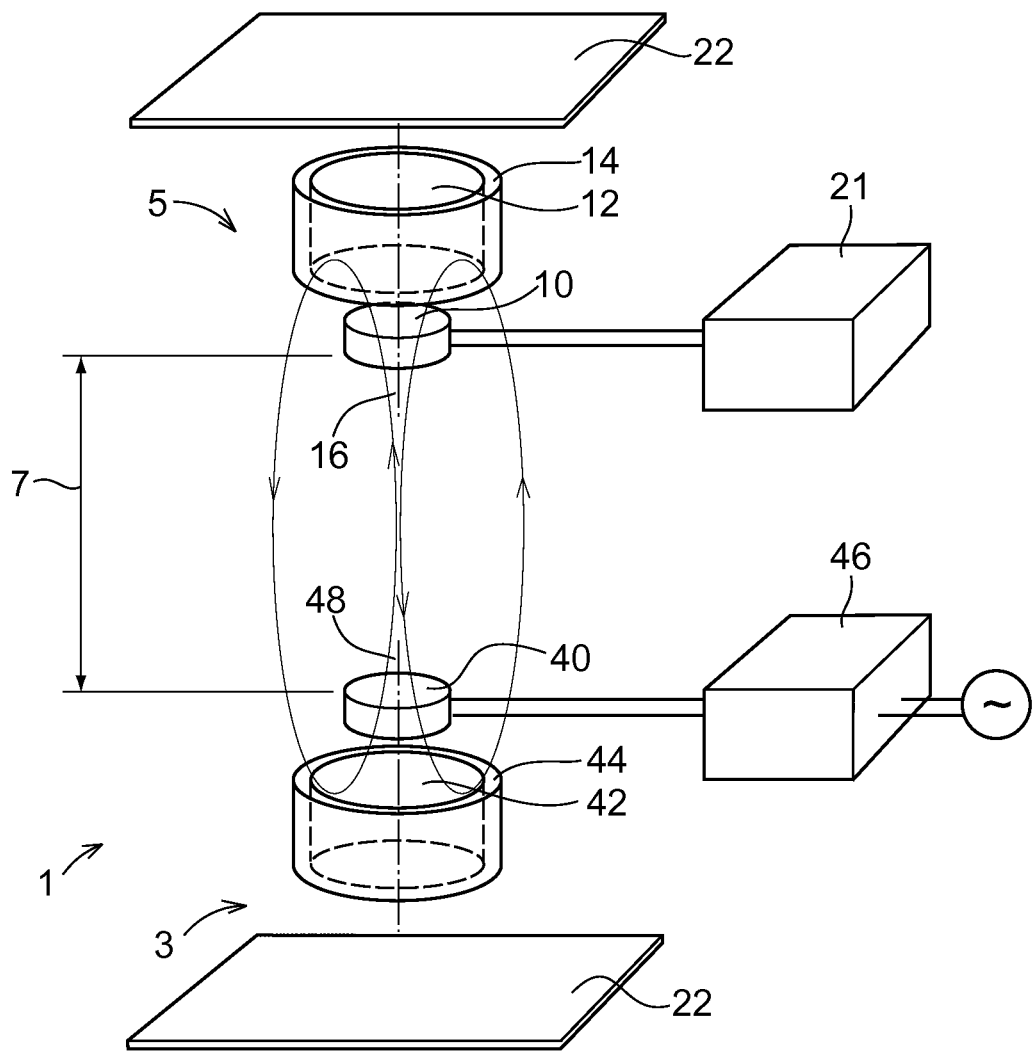
FIG. 1 shows a wireless power transferring device comprising a wireless power transferring unit and a wireless power receiving unit.

FIG. 1 shows a wireless power transferring device 1 comprising a wireless power transferring unit 3 and a wireless power receiving unit 5. The wireless power transferring device 1 is adapted to transfer power from the power transferring unit 3 to the power receiving unit 5. The power transferring unit 3 and the power receiving unit 5 is separated by an air gap 7.

The power transferring device 1 is adapted to transfer power to a vehicle, wherein the power transferring unit 3 is located at the ground and the power receiving unit 5 is located at a lower part of the vehicle.

The wireless power receiving unit 5 is adapted to receive power from the power transferring unit 3. The wireless power receiving unit 5 comprises an induction coil 10, a receiving concentrator core 12, and a receiving guide member 14.

The induction coil 10 is adapted to be subjected to power in the form of an alternating magnetic field from the power transferring unit 3. Thereby an alternating current is induced in the induction coil 10.

A high magnetic field density and a high frequency of the alternating magnetic field are being used. The frequency of the alternating magnetic field is in the range of 5-200 kHz, preferably 10-100 kHz.

The receiving concentrator core 12 surrounds the induction coil 10. The receiving concentrator core 12 is adapted to concentrate the magnetic field towards the induction coil 10. The receiving concentrator core 12 comprises a material with low electric conductivity and high magnetic permeability, such as $Fe_2O_3$ with ZnO, NiO, MnO, CuO, etcetera.

The receiving guide member 14 is adapted to guide the magnetic field lines between the air gap 7 and the receiving concentrator core 12 and to provide a smooth transition between the air and the receiving concentrator core 12.

The receiving guide member 14 has a magnetic permeability in the range between the magnetic permeability of the receiving concentrator core 12 and the magnetic permeability of the air.

The magnetic permeability of a material is described by the relative magnetic permeability, which is the ratio between the magnetic permeability of the material and vacuum. The relative magnetic permeability of air is close to 1. The relative magnetic permeability of the receiving concentrator core 12 is high in comparison to the surrounding air. In an embodiment the relative magnetic permeability of the receiving concentrator core 12 is between 100-20000, preferably between 1000-3000.

The induction coil 10 comprises a center axis 16. The receiving concentrator core 12 comprises an envelope surface 18. The receiving concentrator core 12 is a disc, which periphery forms the envelope surface 18. The envelope surface 18 of the receiving concentrator core 12 is directed away from the center axis 16. The receiving guide member 14 is abutting the envelope surface 18 of the receiving concentrator core 12.

The receiving concentrator core 12 is not limited to the disclosed cylindrical form but other forms that are adapted to concentrate the magnetic field are possible, such as a disc with a plurality of sides facing away from the center axis 16, a plurality of bars protruding away from the center axis 16, a ring, etcetera.

Figure 2A:
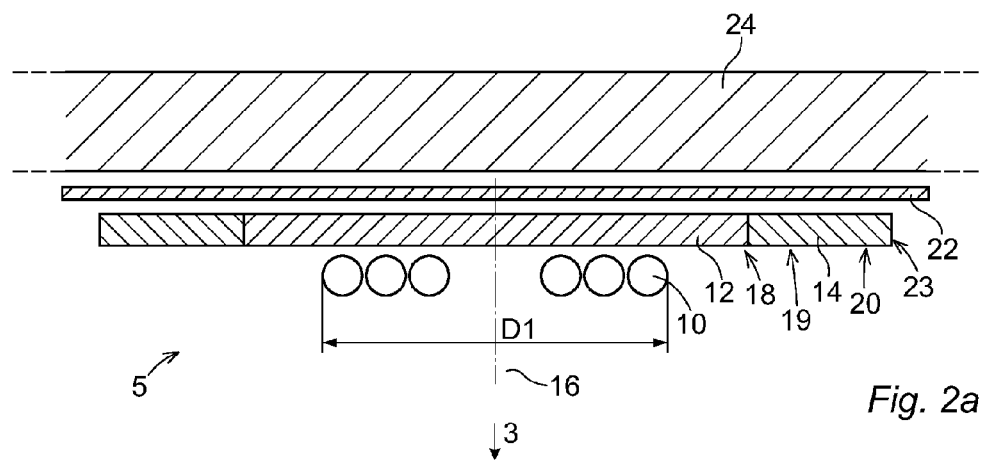
FIG. 2A shows a cross section of a first embodiment of a wireless power receiving unit.
Figure 2B:
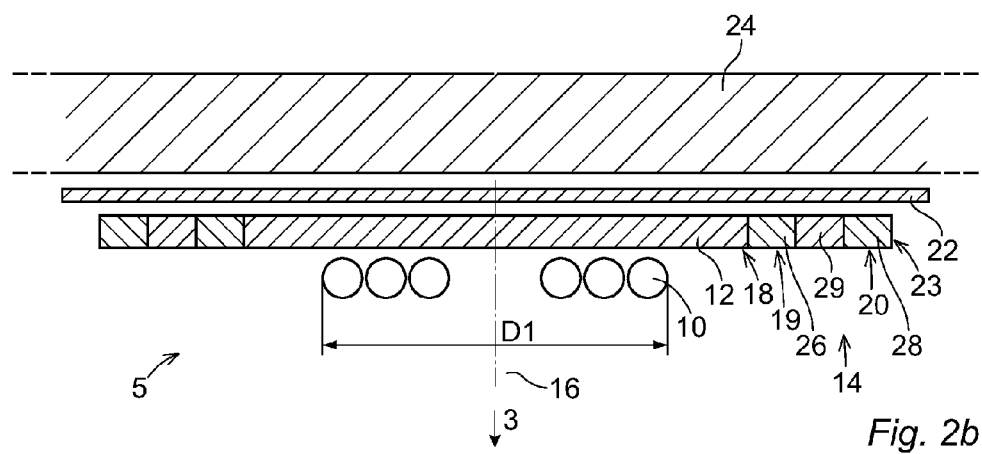
FIG. 2B shows a cross section of a second embodiment of a wireless power receiving unit.

The receiving guide member 14 comprises a cylindrical tube with an inner part 19 and an outer part 20, see FIG. 2a and 2b. The inner part 19 of the receiving guide member 14 comprises an inner surface that is abutting the envelope surface 18 of the receiving concentrator core 12. The receiving guide member 14 is surrounded by air. The outer part 20 of the receiving guide member 14 comprises an outer surface 23 that is abutting the surrounding air.

The power receiving unit 5 is connected to a battery unit 21. The alternating current being induced in the induction coil 10 is adapted to be rectified and charge the battery unit 21.

The power receiving unit 5 further comprises a shield member 22. The shield member 22 is adapted to shield the surrounding from the alternating magnetic field and to concentrate the magnetic field to the area between the power transferring unit and the power receiving unit. The shield member 22 comprises a high conductive material such as aluminum, copper, etcetera.

The wireless power transferring unit 3 is adapted to transfer power to the power receiving unit 5. The power transferring unit 3 comprises a generating coil 40, a transferring concentrator core 42 and a transferring guide member 44. The power transferring unit 3 comprises the corresponding structure of the power receiving unit 5.

The generating coil 40 is adapted to be supplied with an alternating current from a power source 46. The generating coil 40 is adapted to generate an alternating magnetic field that is coupled to the power receiving unit 5.

The power source 46 comprises a compensator (not displayed) adapted to form a resonance circuit with a resonance frequency in the range of 5-200 kHz, preferably 10-100 kHz. The power receiving unit 5 preferably comprises a compensator, which compensator forms the same or similar resonance frequency.

The transferring concentrator core 42 surrounds the generating coil. The transferring concentrator core 42 is adapted to concentrate the magnetic field towards the power receiving unit 5. The transferring concentrator core 42 comprises a material with negligible electric conductivity and high magnetic permeability.

The transferring guide member 44 surrounds the transferring concentrator core 42. The transferring guide member 44 is adapted to provide a transition between air and the transferring concentrator core 42. The transferring guide member 44 has a magnetic permeability in the range between the magnetic permeability of the transferring concentrator core 42 and the magnetic permeability of the air.

The generating coil 40 comprises a center axis 48. The transferring concentrator core 42 comprises an envelope surface 50. The transferring concentrator core 42 is a disc, which periphery forms the envelope surface 50. The envelope surface 50 is directed away from the center axis 48. The transferring guide member 44 is abutting the envelope surface 50 of the transferring concentrator core 42.

The transferring concentrator core 42 is not limited to the disclosed cylindrical form but other forms that are adapted to concentrate the magnetic field are possible, such as a disc with a plurality of sides facing away from the center axis 48, a plurality of bars protruding away from the center axis 48, a ring, etcetera.

Figure 3:
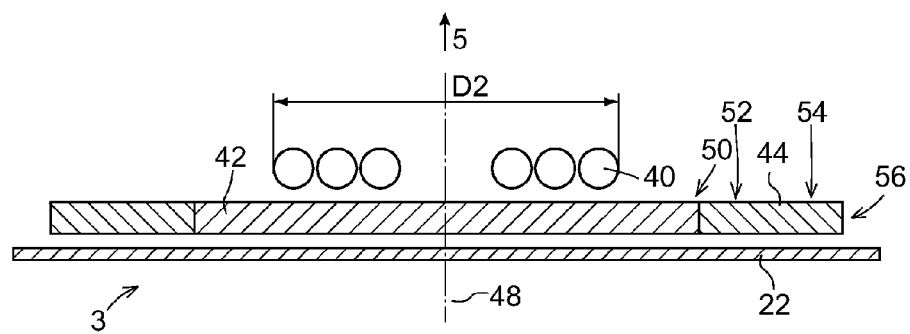
FIG. 3 shows a cross section of a wireless transferring unit.

The transferring guide member 44 comprises a cylindrical tube with an inner part 52 and an outer part 54, see FIG. 3. The inner part 52 of the transferring guide member 44 comprises an inner surface that is abutting the envelope surface 50 of the transferring concentrator core 42. The receiving guide member 44 is surrounded by air. The outer part 54 of the transferring guide member 44 comprises an outer surface 56 that is abutting the surrounding air.

The power transferring unit 3 further comprises a shield member 22. The shield member 22 is adapted to shield the surrounding from the alternating magnetic field. The shield member 22 comprises a high conductive material such as aluminum, copper, etcetera.

FIG. 2a shows a first example of a cross section of a power receiving unit 5. In the shown figure the induction coil 10 comprises three loops of a conductor. In an embodiment the coil 10 comprises a single loop of the conductor. However, the induction coil 10 may comprise any number of loops.

The induction coil 10 is located in vicinity of the receiving concentrator core 12. An outer conductor of the induction coil 10 forms a loop with a first diameter D1. The induction coil 10 comprises the center axis 16. The centre axis 16 of the induction coil 10 is directed towards the power transferring unit 3.

The receiving guide member 14 is abutting the envelope surface 18 of the receiving concentrator core 12. The envelope surface 18 of the receiving concentrator core 12 is directed away from the center axis 16.

The receiving guide member 14 comprises the outer surface 23, which outer surface 23 is abutting the surrounding air. The outer surface 23 is directed away from the center axis of the induction coil 10. Accordingly, the receiving guide member 14 is located between the receiving concentrator core 12 and the surrounding air.

The receiving guide member 14 has a magnetic permeability in a range between the magnetic permeability of the receiving concentrator 12 and the surrounding air. Thereby the receiving guide member 14 provides a transition of the high magnetic permeability of the receiving concentrator core 12 to the magnetic permeability of the surrounding air.

In a preferable embodiment the magnetic permeability of the receiving guide member 14 is decreasing continuously from the inner part to the outer part. A continuous decrease of the magnetic permeability of the receiving guide member provides an ideal transition for the alternating magnetic field.

The power receiving unit 5 further comprises the shield member 22. The shield member 22 is adapted to shield the surrounding from the alternating magnetic field.

The shield member 22 is located further away from the power transferring unit 3 in comparison to the receiving concentrator core 12. The power receiving unit 5 is adapted to be attached to an arrangement 24 comprising a ferromagnetic material, such as the lower steel body of a vehicle.

The shield member 22 is adapted to be located in between the receiving concentrator core 12 and the arrangement 24 comprising the ferromagnetic material. Thereby, the shield member 22 shields the arrangement 24 from the alternating magnetic field.

FIG. 2b shows a second embodiment of a cross section of the power receiving unit 5. The receiving guide member 14 of the power receiving unit 5 in FIG. 2b has a different structure from the receiving guide member 14 in FIG. 2a. The receiving guide member 14 in FIG. 2a and FIG. 2b are otherwise generally the same.

The receiving guide member 14 comprises an inner ring 26, an outer ring 28 and an intermediate ring 29. The inner ring 26 comprises an inner surface that is abutting the envelope surface 18 of the receiving concentrator core 12. The outer ring 28 comprises an outer surface 52 that is abutting the surrounding air. The intermediate ring 29 is between the inner ring 26 and the outer ring 28. The intermediate ring 29 is abutting both the inner ring 26 and the outer ring 28.

The magnetic permeability of the inner ring 26 is higher than the outer ring 28 and the intermediate ring 29. The magnetic permeability of the intermediate ring 29 is in the range between the inner ring 26 and the outer ring 28.

Accordingly, the magnetic permeability of the receiving guide member 14 is decreasing in a stepwise manner from the receiving concentrator core 12 to the surrounding air. Thereby the receiving guide member 14 provides a stepwise transition of the high magnetic permeability of the receiving concentrator core 12 to the magnetic permeability of the surrounding air.

FIG. 3 shows a cross section of the power transferring unit 3. The power transferring unit 3 comprises the generating coil 40, the transferring concentrator core 42 and the transferring guide member 44.

The transferring guide member 44 is arranged to concentrate the generated magnetic field between the air gap 7 and the transferring concentrator core 42 and to provide a smooth transition between the air and the transferring concentrator core 42

The structure of the power transferring unit 3 is the same or substantially the same as in the power receiving unit 5.

The generating coil 40 is located in vicinity of the transferring core 42. The conductor 10 of the generating coil 40 forms three loops, wherein an outer loop of the conductor 10 has a second diameter D2. However, the generating coil 40 may comprise any number of loops. The generating coil 40 comprises the center axis 48. The centre axis 48 of the generating coil 40 is directed towards the power receiving unit 5.

The transferring guide member 44 is abutting the envelope surface 50 of the transferring concentrator core 42. The envelope surface 50 of the transferring concentrator core 42 is directed away from the center axis 50. The transferring guide member 44 is abutting the surrounding air. Accordingly, the transferring guide member 44 is located radially between the transferring concentrator core 42 and the surrounding air.

The transferring guide member 44 has a magnetic permeability in a range between the magnetic permeability of the transferring concentrator core 42 and the surrounding air. Thereby the transferring guide member 44 provides a smooth transition between the high magnetic permeability of the transferring concentrator core 42 to the magnetic permeability of the surrounding air.

The invention is not limited to the disclosed embodiment but may be varied and modified within the scope of the following claims.

For example, the power transferring device 1 may be adapted to transfer power in both directions between the power transferring unit 3 and the power receiving unit 5. In an embodiment, the power transferring unit 3 and the power receiving unit 5 are identical or substantially identical units.

What is claimed is:

1. A wireless power receiving unit for receiving power, wherein the power receiving unit comprises:
    an induction coil, the induction coil being subjected to power in the form of an alternating magnetic field from a power transferring unit so that an alternating current is induced in the induction coil,
    a receiving concentrator core for concentrating the magnetic field towards the induction coil, wherein the receiving concentrator core is surrounded by a medium, and
    a receiving guide member providing a transition for the magnetic field between the medium and the receiving concentrator core, the receiving guide member abutting the receiving concentrator core, the receiving guide member having a magnetic permeability in the range between the magnetic permeability of the receiving concentrator core and the medium,
wherein the induction coil is turned about a center axis, the receiving concentrator core comprises opposing base surfaces and a peripheral surface extending between the opposing base surfaces, the peripheral surface being directed away from the center axis in a radial direction, and the receiving guide member at least partially covers the peripheral surface.

2. The wireless power receiving unit according to claim 1, characterized in that the receiving guide member at least partly surrounds the receiving concentrator core.

3. The wireless power receiving unit according to claim 1, characterized in that the receiving guide member comprises an inner part abutting the receiving concentrator core and an outer part abutting the surrounding medium.

4. The wireless power receiving unit according to claim 3, characterized in that the magnetic permeability of the receiving guide member is decreasing from the inner part to the outer part.

5. The wireless power receiving unit according to claim 3, characterized in that the magnetic permeability of the receiving guide member is decreasing continuously from the inner part to the outer part.

6. The wireless power receiving unit according to claim 1, characterized in that the receiving guide member comprises an inner ring abutting the receiving concentrator core and an outer ring abutting the surrounding medium, wherein the magnetic permeability of the inner ring is higher than the outer ring.

7. The wireless power receiving unit according to claim 1, characterized in that the power receiving unit comprises a shield member shielding the magnetic field, wherein the shield member comprises a conductive non-magnetic material.

8. The wireless power receiving unit according to claim 7, characterized in that the shield member is located in between the induction coil and an arrangement comprising a ferromagnetic conductive material.

9. The wireless power receiving unit according to claim 1, characterized in that the power receiving unit is connected to a battery unit, wherein, with the induction coil being subjected to power in the form of the alternating magnetic field, the alternating current induced in the induction coil charges the battery unit.

10. The wireless power receiving unit according to claim 1, characterized in that the power receiving unit is disposed in a vehicle and directed towards the power transferring unit.

11. The wireless power receiving unit according to claim 10, wherein the power transferring unit is disposed at the ground.

12. A wireless power transferring unit for transferring power, wherein the power transferring unit comprises:
a generating coil, the generating coil generating power in the form of an alternating magnetic field that is subjected to a power receiving unit,
a transferring concentrator core for concentrating the magnetic field towards the power receiving unit, wherein the transferring concentrator core is surrounded by a medium, and
a transferring guide member providing a transition for the magnetic field between the medium and the transferring concentrator core, the transferring guide member at least partly abutting the transferring concentrator core, the transferring guide member having a magnetic permeability in the range between the magnetic permeability of the transferring concentrator core and the medium,
wherein the generating coil is turned about a center axis, the transferring concentrator core comprises opposing base surfaces and a peripheral surface extending between the opposing base surfaces, the peripheral surface being directed away from the center axis in a radial direction, and the transferring guide member at least partially covers the peripheral surface.

13. The wireless power transferring unit according to claim 12, characterized in that the transferring guide member at least partly surrounds the transferring concentrator core.

14. A wireless power transferring device comprising:
a wireless power transferring unit for transferring power, wherein the power transferring unit comprises:
a generating coil, the generating coil generating power in the form of an alternating magnetic field that is subjected to a power receiving unit,
a transferring concentrator core for concentrating the magnetic field towards the power receiving unit, wherein the transferring concentrator core is surrounded by a medium, and
a transferring guide member providing a transition for the magnetic field between the medium and the transferring concentrator core, the transferring guide member at least partly abutting the transferring concentrator core, the transferring guide member having a magnetic permeability in the range between the magnetic permeability of the transferring concentrator core and the medium; and
a wireless power receiving unit, wherein the power receiving unit comprises:
an induction coil, the induction coil being subjected to power in the form of an alternating magnetic field from a power transferring unit so that an alternating current is induced in the induction coil,
a receiving concentrator core for concentrating the magnetic field towards the induction coil, wherein the receiving concentrator core is surrounded by a medium, and
a receiving guide member providing a transition for the magnetic field between the medium and the receiving concentrator core, the receiving guide member abutting the receiving concentrator core, the receiving guide member having a magnetic permeability in the range between the magnetic permeability of the receiving concentrator core and the medium;
wherein the induction coil is turned about a center axis, the receiving concentrator core comprises opposing base surfaces and a peripheral surface extending between the opposing base surfaces, the peripheral surface being directed away from the center axis in a radial direction, and the receiving guide member at least partially covers the peripheral surface.

* * * * *